United States Patent [19]

Walsh

[11] 4,309,344

[45] Jan. 5, 1982

[54] PROCESS FOR THE PRODUCTION OF A PROTEIN ISOLATE HAVING IMPROVED WHITENESS

[75] Inventor: James E. Walsh, St. Louis, Mo.

[73] Assignee: Ralston Purina Company, St. Louis, Mo.

[21] Appl. No.: 73,407

[22] Filed: Sep. 7, 1979

[51] Int. Cl.$^3$ ............................................. A23J 1/14
[52] U.S. Cl. ............................... 260/123.5; 426/507; 426/634; 426/656; 260/112 R
[58] Field of Search ...................... 260/123.5, 112 R; 426/656

[56] References Cited

U.S. PATENT DOCUMENTS

| | | | |
|---|---|---|---|
| 2,243,871 | 6/1941 | Lawrence et al. | 260/123.5 |
| 2,331,619 | 10/1943 | Morse | 260/123.5 |
| 2,460,627 | 2/1949 | Erkko et al. | 260/123.5 |
| 2,589,867 | 3/1952 | Rowe | 260/123.5 |
| 2,607,767 | 8/1952 | Vassel | 260/123.5 |
| 2,666,049 | 1/1954 | Rowe | 260/123.5 |
| 2,862,918 | 12/1958 | Meyer et al. | 260/123.5 |
| 2,881,159 | 4/1959 | Circle et al. | 260/123.5 |
| 3,043,826 | 7/1962 | Beaber et al. | 260/123.5 |
| 3,607,860 | 9/1971 | Yamato et al. | 260/123.5 |
| 4,072,670 | 2/1978 | Goodnight, Jr. et al. | 260/123.5 |
| 4,113,716 | 9/1978 | Gomi et al. | 260/123.5 |

*Primary Examiner*—Howard E. Schain
*Attorney, Agent, or Firm*—Virgil B. Hill

[57] ABSTRACT

A simplified process for the production of a protein isolate from defatted vegetable protein material is disclosed which comprises extracting a defatted vegetable protein material with an aqueous extractant to provide a protein extract, followed by adjustment of the pH of said extract to the isoelectric point of the protein to provide a protein precipitate. The protein precipitate is thereafter heated to a temperature between about 115°–145° F. and concentrated to a solids level of at least about 44% by weight. This unexpectedly results in the production of a protein isolate which has an improved degree of whiteness over those isolates produced by prior art techniques.

33 Claims, 1 Drawing Figure

PROCESS FOR THE PRODUCTION OF A PROTEIN ISOLATE HAVING IMPROVED WHITENESS

BACKGROUND OF THE INVENTION

The present invention generally relates to an improved process for the production of a protein isolate from a vegetable protein material such as an oilseed meal which not only is highly efficient and simple to practice on a commercial scale, but provides a protein isolate with an improved degree of whiteness.

Protein isolates derived from vegetable protein sources such as the oilseeds, typically soybeans, cottonseed and the like, have contributed substantially to the economic importance of these vegetable protein materials as a crop. The isolates derived from oilseeds in particular have proven to be a useful nutritional supplement in a variety of foods and beverages and with further processing have been suitably texturized to simulate a variety of natural protein foodstuffs such as meat and cheese. A protein isolate can be generally characterized as a product resulting from the extraction, subsequent concentration and purification of proteinaceous material from a proteinaceous source such as a vegetable protein or oilseed material. Typically, the protein isolate on a moisture free basis will have a protein content which will range between about 90 and 98% by weight after isolation of the protein from the nonproteinaceous and cellular material present in most types of vegetable protein material.

A conventional procedure for the isolation of protein from a vegetable protein material such as an oilseed meal or flakes, comprises as the first step, removing soluble lipids or oil from the vegetable protein material either by means of a mechanical apparatus such as an expeller or by solvent extraction with aliphatic hydrocarbons such as hexane. The resulting material obtained from solvent extraction of the oilseed or vegetable protein source is commonly referred to as defatted oilseed meal and is normally in the form of flakes which will still contain many ingredients including complex and varying types of proteins, sugars, fibers, etc. The protein and sugars are then dissolved out of the flakes by dispersing the flakes in an aqueous bath and preferebly adding a food grade alkaline material to raise the pH of the mixture to above about 6.5 to expedite removal of the protein. Typical alkaline materials include sodium, potassium, or calcium hydroxide. The resultant liquor containing the dissolved proteins and sugars is then separated from undissolved solids either by passing the mixture through a screen or by centrifugation.

The clarified liquor is then reduced in pH to between about 4.0 to 5.0 in order to lower the pH in the mixture to near the isoelectric point of the protein. Reduction of pH is achieved by the addition of an acidic reagent such as a mineral or organic acid. The protein immediately begins to precipitate from the solution as a "curd". Thereafter centrifugation or filtration is carried out in order to concentrate the curd to a solids level of between about 20 and 30% by weight, and at this time the "mother liquor" or "whey" is separated from the precipitated protein which is in the form of a curd. At this point of the process, the protein curd while being entirely functional in a wide variety of food applications, is not considered to possess the best color since undesirable materials remain entrapped in the precipitated protein giving it a "yellowish" cast and further processing is normally required to provide an isolate with a light enough color to be suitable for use in some food products. Therefore, in the prior art the curd obtained from acid precipitation of the alkaline extract of the soy flakes was reslurried in water after which additional centrifugation or separation of the protein was carried out in order to remove any entrapped undesirable components which effected the color. Repeated washing of the precipitated curd with water was believed to be necessary in order to substantially improve the whiteness of the resultant curd since it seems logical that additional washing would remove a larger percentage of entrapped material. It has been recognized, however, that while repeated washings of the curd with either water, alcohols or mixtures thereof results in a slight improvement in whiteness, nevertheless, repeated processing of this type reduces the overall efficiency of the isolation process since a certain percentage of the protein is lost during each washing step thereby reducing the yield. Furthermore, alcohol washing reduces the solubility of the protein source. Additionally, large quantities of whey are discarded with each washing.

A basic breakthrough was made in the instant invention by considering ways and alternatives which would simplify the conventional process for the production of a protein isolate from a vegetable protein material and in so doing it was unexpectedly discovered that not only could the process be simplified to a great extent but an isolate could be obtained which was much whiter in color than isolates which underwent far more extensive processing techniques.

This unexpected improvement in whiteness was achieved by heating the precipitated curd to a critically defined temperature range of about 115°-145° F. preferably about 130° to 135° F. followed by concentration of the curd to a solids level exceeding about 44% by weight. Concentration of the solids to such a level not only improves the yield and efficiency of the process but causes an unexpected improvement in whiteness of the isolate.

The noted temperature range is critical relative to obtaining the necessary level of solids of at least about 44% by weight to improve the economy and yield of the process. Certainly it is apparent that concentration to a high solids level with result in a more efficient and economical process although the improvement in whiteness by concentration to the noted minimum solids level was entirely unexpected.

It is, therefore, an object of the present invention to provide an improved process for the production of a protein isolate from a vegetable protein source.

It is also an object of the present invention to provide an improved process for the production of a protein isolate which is economical and reliable to practice on a commercial scale.

It is a further object of the present invention to provide a process for the production of a protein isolate which has a satisfactory degree of whiteness and hence functionality in a variety of food products.

It is also an object of the present invention to provide a process for the production of isolates from a vegetable protein source wherein a high yield of protein in the isolation process is obtained.

SUMMARY OF THE INVENTION

Figure 1:
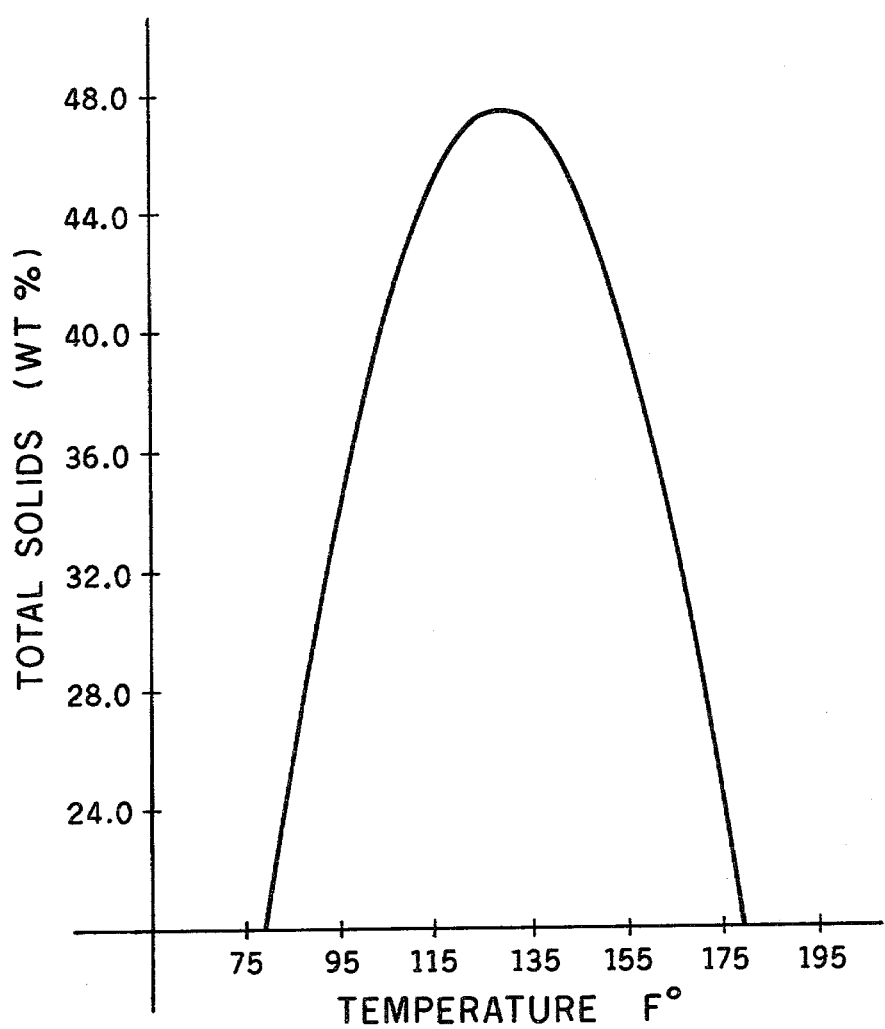
FIG. 1 is a graphical representation of the relationship between the temperature employed to heat the protein precipitate and total solids of the precipitate.

The present invention, therefore, comprises a process for the production of a protein isolate from a vegetable protein material which generally comprises; extracting defatted vegetable protein material with an aqueous extractant to thereby solubilize the protein and provide a protein extract having a pH of at least about 6.5. The insoluble solids are then separated from the aqueous extractant by a suitable separation technique such as centrifugation and the like, and the pH of the protein extract is lowered to near or at the isoelectric point of the protein to precipitate the protein. Following initial precipitation of the protein a critical feature of the instant invention which differs from the isolation procedures of the prior art, includes heating the precipitated curd to a critically defined temperature range of 115°–145° F. followed by concentration of the protein precipitate to a solids level of at least about 44%. If the noted temperature range is exceeded the "curd" does not readily dewater and it becomes difficult to obtain a solids level exceeding 35% by weight. By the same token, the use of a lower temperature does not result in precipitate that can easily be dewatered to a solids level above 44% by weight. Concentration of the protein precipitate by removal of the whey fraction can then be carried out by a wide variety of processing techniques and the present invention is not intended to be limited by the specific technique employed. Typical process concentration techniques which would satisfactorily remove the whey fraction include centrifugation and the present invention is not intended to be limited by the particular technique provided that the quality of the protein material is not altered or affected in any manner by the concentration step.

Following concentration of the protein precipitate and removal of a substantial percentage of the concentrated whey, the concentrated precipitate is dewatered to provide a dry protein isolate which is suitable for a variety of food applications. Dewatering of the concentrated precipitate can be carried out by a wide variety of drying and water removal techniques, including air drying, freeze drying, drying under vacuum, and preferably is carried out in the instant invention by conventional spray drying techniques.

The process of the instant invention, therefore, provides a bland, homogeneous protein isolate with an improved degree of whiteness and a high degree of functionality in a variety of food applications. The noted isolate can be converted to food products of a variety of shapes and forms, and is especially useful in providing structured food products or textured food analogs of natural protein foods such as meat, fish, cheese, and the like. If so desired, the protein isolate of the instant invention can undergo further processing such as the physico thermo vapor flash treatment characterized in U.S. Pat. No. 3,642,490 to further improve the flavor thereof. Indeed, additional processing or flavor removal techniques may be conveniently carried out economically in view of the relative simplicity of the isolation procedure of the instant invention.

DESCRIPTION OF THE PREFERRED EMBODIMENT

The instant invention, therefore, comprises a process for the production of a soy protein isolate which is much simpler than that employed by the prior art and more efficient in terms of yield of the protein and which unexpectedly provides a product with an improved degree of whiteness. Because the unique processing step of the instant invention which comprises removal of the whey fraction and concentration of the protein precipitate to a high solids level of above about 44% is preferably employed in combination with a preliminary heating step and because it is desired to explain the entire isolation procedure in detail, the invention will be explained herein by describing the operation from the beginning. Although the instant operation will be described with respect to soybean products because this is a major area of concern for which the instant processes relate and the process is particularly suited for producing a desirable isolate from soybean materials, nevertheless, the instant process is not intended to be so limited and as such will be generally suitable for the isolation of protein from a variety of vegetable protein sources.

In a brief outline of the total process, the soybeans or vegetable protein material which form the starting material of the instant invention are preferably defatted and the oil is extracted to leave the soybean meal or flakes. More specifically, the soybeans may be crushed or ground and passed through a conventional oil expeller. However, it is preferable to remove the oil by solvent extraction in techniques, using aliphatic hydrocarbons such as hexane, or azeotropes thereof, and these have been conventionally employed for this purpose. Following extraction to remove residual lipids and oil, vegetable protein flakes having a high degree of dispersibility are obtained.

Following grinding or treatment of the vegetable protein material, the resulting solids, which in the case of soybeans are commonly referred to as soybean flakes, contain many ingredients including complex proteins, sugars, fibers, and various other types of materials. Initially, these proteins and many of the soluble sugars are dissolved from the other constituents of the soybean meal including cellulosic fibers and the like. This is accomplished by placing the flakes in an aqueous bath to provide a mixture having a pH of at least about 6.5 and preferably between about 7.0 and 10.0. Typical of alkaline reagents which may be employed if it is desired to elevate the pH above 6.5 include sodium hydroxide, potassium hydroxide, calcium hydroxide, or other commonly accepted food grade alkaline reagents and the present invention is not intended to be limited in this respect. A pH of above about 7.0 is generally preferred since an alkaline extraction facilitates solubilization of the protein, although the exact pH which may be employed should not be considered as limiting the present invention. Typically, the pH of the aqueous extract will be at least about 6.5 and preferably between about 7.0 to 10. The ratio by weight of the aqueous extractant to the vegetable protein material that is typically employed in the instant process is between about 5 to 20 to 1 and preferably is employed at a ratio of about 10:1. The exact ratio of extractant to protein material is not critical and should not be considered a limiting factor in practice of the instant invention.

It is also desirable in the process of the instant invention that an elevated temperature be employed during the aqueous extraction step to facilitate solubilization of the protein, although ambient temperatures are equally satisfactory if desired. The exact temperature which may be employed is not intended to limit the instant process for the isolation of protein, although the actual temperature of extraction may range from ambient up to 120° F. with a preferred temperature of 90° F. The period of time for extraction with the aqueous medium is further not intended to limit the present invention and a period of time between about 5 to 120 minutes may be conveniently employed with a preferred time of about 30 minutes.

Following extraction of the vegetable protein material, the aqueous extract of protein can preferably be stored in a holding tank or suitable container while a second extraction is performed on the insoluble or residual solids from the first aqueous extraction step. Although this additional extraction step is considered to be only a preferred embodiment of the instant invention and should not be considered a limiting feature, nevertheless, it is very desirable to carry out a second aqueous extraction of the insoluble solids remaining after the first extraction step in order to remove any residual protein which may not have been removed during the initial extraction and thereby increase the efficiency and yield of the instant process. If so desired, however, this additional step may be completely avoided and one may proceed, if desired, immediately to the precipitation of the protein. This additional extraction step, therefore, is being described only for the purposes of characterizing a preferred embodiment of the instant process.

The insoluble solids from the first extraction is extracted with a second portion of an aqueous extractant to provide a second aqueous protein extract. The second extraction of the spent flakes or insoluble solids is carried out in a similar manner to the first extraction step at a pH of at least about 6.5 or preferably between about 7.0 to 10.0. In the second extraction, however, it is preferred that a ratio by weight of extractant to the ground protein material is between about 4 to 15 to 1 and preferably is at a ration of about 6:1. Otherwise, the conditions of the second extraction are essentially the same as that of the first extraction and following extraction, the second aqueous protein extract is separated from the residual material and combined with the first aqueous protein extract prior to the precipitation step which is hereafter described.

The combined aqueous protein extracts at a pH of at least 6.5 or preferably 7.0 to 10.0 are then precipitated by adjustment of the pH of the extracts to at or near the isoelectric point of the protein to thereby form an insoluble precipitate. Although the actual pH to which the protein extracts are adjusted will vary depending upon the vegetable protein source employed, nevertheless, insofar as a complete description of the instant invention and pursuant to a description of the process as it applies to soy protein, this would typically be between about 4.0 to 5.0 and preferably between about 4.4 and 4.6. The precipitation step may be conveniently carried out with the addition of a common food grade acidic reagent typically such as acetic acid, sulfuric acid, phosphoric acid, hydrochloric acid, or with any other suitable acidic reagent.

Following precipitation of the protein, the precipitated curd is heated to a temperature of between about 115°–145° F. and held at this temperature range for a period of time of between about 1–300 sec., preferably 130° to 135° F. for a preferred period of time of between about 2 and 10 seconds. The manner of heating the precipitated curd is not critical relative to the present invention although a preferred way of heating is to inject steam into the slurry to elevate the temperature. A variety of steam injection devices are available for this purpose and the exact manner of injecting steam or the apparatus employed for this purpose is not intended to limit the present invention.

Following precipitation of the protein, a concentration step is carried out to remove as large of a percentage of the whey as possible. The protein precipitate is concentrated to a solids level of above about 44% by weight. There is no upper limit and it is desirable to remove the whey in order to concentrate the protein to as high of a level as possible. The particular means employed to concentrate the protein precipitate is not intended to limit the present invention and concentration may be carried out by a wide variety of processing techniques including centrifugation. It is, however, an important factor that the particular concentration technique must remove the whey or mother liquor and not employ conditions which would adversely affect the quality of the protein in any manner. The principal effect of the concentration step as has been previously noted, is to remove as completely as possible the whey or mother liquor from the precipitate. It is further desirable, although not limiting, if a neutralized dried product is desired to adjust the pH of the precipitated protein to between about 6–8 and preferably to about 7.0 prior to drying.

Following concentration of the protein precipitate to a solids level of above about 44% by weight the precipitate may be then conveniently dried or dewatered or alternatively can be further treated as described in U.S. Pat. No. 3,642,490. Although the present invention is not intended to be limited by the particular dewatering technique employed, it is preferred to employ flash drying because of the uniform fine powdered product normally obtained by techniques of this type. Flash drying techniques further provide an economical and continuous processing technique resulting in excellent dispersibility characteristics of the powders produced thereby. Of all the flash drying techniques, spray drying is preferred and this is the preferred means of dewatering or drying in the instant invention. Although similar flash drying and the like may be employed, the spray drying is the method of choice and while other drying techniques may be employed, the product tends to exhibit the best dispersibility characteristics if spray drying is employed.

Although the inventive concepts will be readily understood from the foregoing description by one having ordinary skill in this art, the following illustrative Examples are given to assure a complete understanding.

EXAMPLE 1

150 lb/hr of defatted soybean flakes were fed to an extraction tank to which was added 1,500 lb/hr of water which has been heated to 90° F. Sufficient calcium hydroxide (about 1.3% by weight) is added to adjust the pH of the mixture to 9.7. The soy flakes were extracted for a period of 30 minutes after which the aqueous solution was separated from the extracted flakes by centrifugation. The first aqueous extract was held while the extracted flake residue was redispersed in 900 lb/hr of water at a temperature of 90° F. The pH of the mixture at this point was 9.0 A second aqueous extract from the flakes was obtained by centrifugation and combined with the first aqeuous extract.

To the combined aqueous extracts 85% phosphoric acid was added to adjust the pH to 4.5 and precipitate the protein. The precipitated protein is then heated by injecting steam into the precipitated protein slurry to a temperature of 135° F. and held for a period of time of between about 8–10 seconds. The precipitated protein was then concentrated to a solids level of 45% by weight by centrifugation.

For comparative purposes, a control isolate was prepared generally as described above but the protein precipitate was not heated and the precipitated protein was concentrated to a solids level of 38% by weight by centrifugation.

A quantity of the control isolate, as well as the isolate, produced pursuant to the present invention was further processed according to the procedure described in U.S. Pat. No. 3,642,490, herein incorporated by reference.

In this regard, slurries were prepared from both the protein precipitate derived from the control isolate and that processed pursuant to the present invention. The solids content of both slurries was adjusted to 15% with water and sodium hydroxide was added to adjust to pH to about 7.0.

Each slurry is then passed through a jet cooker under a pressure of 85 psig simultaneously with steam ejection from the jet cooker into a pressure retention chamber. The steam heats the slurry through the jet cooker to a temperature of 305° F. After 9 seconds, progressive portions of the heated slurry are suddenly discharged into a receiver at below atmospheric pressure. The vapors are removed from the purified slurry. Both slurries are then spray dried to a moisture content of about 4% by weight. A number of samples were taken of both isolates and analyzed for moisture protein and pH. These results are set forth in Table 1 below.

TABLE I

| Number of Samples | | Avg. % Protein (Dry Basis) |
|---|---|---|
| Control Isolate | 3 | 93.3 |
| Isolate of Present Invention | 19 | 92.3 |

| Avg. Moisture (%) | Avg. pH |
|---|---|
| 4.2 | 7.1 |
| 4.1 | 7.1 |

5% by weight aqueous slurries were then prepared of each of the above samples and evaluated for color on a Hunter Lab Colorimeter, wherein color is measured by comparative readings on a "L", "a", and "b" scale. These results are set forth in Table 2 below and represent mean values ± standard deviation of the number of samples tested.

TABLE 2

| No. Of Samples | | 5% Slurry Color | | |
|---|---|---|---|---|
| | | "L" | "a" | "b" |
| Control Isolate | 3 | 63.1 ± 0.9 | −2.4 ± 0.4 | 7.9 ± 0.3 |
| Isolate of the Present Invention | 19 | 69.1 ± 0.9 | −2.3 ± 0.2 | 8.8 ± 0.3 |

It may be seen from the above data that a 5% aqueous slurry containing the isolate of the present invention was significantly whiter than the control isolate. The "L" value for the above readings generally corresponds to the degree of whiteness of the isolate and the higher the "L" reading the whiter the isolate. It may, therefore, be seen from the above data that the isolate of the present invention was significantly whiter than the control isolate.

EXAMPLE 2

To illustrate the importance of the temperature to which the protein precipitate is heated insofar as the solids content of the precipitate the following tests were carried out. A quantity of soy flakes were extracted and processed as described in Example 1 to produce a protein precipitate which was heated at various temperatures for about 2.4 seconds and then concentrated by centrifugation. Centrifugation conditions were the same for each sample that was concentrated. The resultant concentrated isolate was analyzed for total solids content.

These results are graphically illustrated in FIG. 1 which shows the temperature at which the precipitate was heated as compared to the total solids content of precipitate after concentration. It may be seen that a solids level of 44% or above is achieved within a relatively narrow temperature range of 115° to 145° F. which in turn relates to the color of the isolates produced pursuant to Example 1.

Having therefore fully described the present invention, it will readily be apparent that many changes and modifications may be made thereto without departing from the spirit or scope of the invention as set forth herein.

What is claimed is:

1. A process for the production of a protein isolate from a defatted vegetable protein material comprising:
   (a) extracting a vegetable protein material with an aqueous extractant to provide an aqueous protein extract having a pH of at least about 6.5;
   (b) adjusting the pH of said extract to the isoelectric point of the protein to precipitate the protein;
   (c) heating the precipitated protein to a temperature of between about 115°–145° F. followed by;
   (d) concentrating the protein precipitate to to a solids level of above about 44% by weight.

2. A process as set forth in claim 1 wherein the precipitated protein is heated to a temperature of between about 130° to 135° F.

3. A process as set forth in claim 1 wherein extraction of the vegetable protein meaterial is carried out at a pH of between about 7.0 and 10.0.

4. A process as set forth in claim 1 wherein the ratio by weight of aqueous extractant to protein material is between about 5 to 20 to 1.

5. A process as set forth in claim 4 wherein the ratio by weight of extractant to protein material is about 10:1.

6. A process as set forth in claim 1 wherein said aqueous extraction is carried out at a temperature of between about ambient to 120° F.

7. A process as set forth in claim 6 wherein said extraction is carried out at a temperature of about 90° F.

8. A process as set forth in claim 1 wherein the pH is adjusted to between about 4.4 to 4.6.

9. A process as set forth in claim 1 including the step of dewatering the concentrated protein precipitate to provide a dried protein isolate.

10. A process as set forth in claim 9 wherein dewatering of the concentrated precipitate is performed by spray drying of the precipitate to provide a dry protein isolate.

11. A process as set forth in claim 1 wherein heating of the precipitate is carried out for between about 1 and 300 seconds.

12. A process as set forth in claim 11 wherein heating of the precipitate is carried out for between about 2–10 seconds.

13. A process for the production of a protein isolate from a defatted vegetable protein material comprising:
  (a) extracting a vegetable protein material with a first portion of an aqueous extractant to provide a first aqueous protein extract having a pH of at least about 6.5;
  (b) separating the insoluble solids from said first extract and extracting said solids with a second portion of an aqueous extractant to provide a second aqueous protein extract having a pH of at least about 6.5;
  (c) combining said protein extracts and adjusting the pH thereof to the isoelectric point of the protein to precipitate the protein;
  (d) heating the precipitated protein to a temperature of between about 115°–145° F. followed by;
  (e) concentrating the protein precipitate to a solids level of above about 44% by weight.

14. A process as set forth in claim 13 wherein said first alkali extraction is carried out at a pH of between about 7.0 and 10.0.

15. A process as set forth in claim 13 wherein the ratio by weight of said first portion of aqueous extractant to said protein material is between about 5 to 20 to 1.

16. A process as set forth in claim 15 wherein the ratio by weight of said first portion of aqueous extractant to protein material is about 10:1.

17. A process as set forth in claim 13 wherein the ratio by weight of said second portion of aqueous extractant to insoluble solids is between about 6:1.

18. A process as set forth in claim 13 wherein said aqueous extraction is carried out at a temperature of between about ambient to 120° F.

19. A process as set forth in claim 13 wherein said extraction is carried out at a temperature of about 90° F.

20. A process as set forth in claim 13 wherein the pH is adjusted to between about 4.4 to 4.6.

21. A process as set forth in claim 13 including the step of dewatering the concentrated protein precipitate to provide a dried protein isolate.

22. A process as set forth in claim 13 wherein heating of the precipitate is carried out at a temperature of between about 130° to 135° F.

23. A process as set forth in claim 13 wherein heating of the precipitate is carried out at a time of between about 1 to 300 seconds.

24. A process as set forth in claim 24 wherein heating of the precipitate is carried out at a time of between about 2–10 seconds.

25. A process for the production of a protein isolate from a defatted vegetable protein material comprising:
  (a) extracting a vegetable protein material with an aqueous extractant to provide an aqueous extract having a pH of between about 7.0 and 10.0;
  (b) adjusting the pH of said extract to between about 4.0 to 5.0 to precipitate the protein;
  (c) heating the precipitated protein to a temperature of between about 115°–145° F. followed by;
  (d) concentrating the protein precipitate to a solids level of above about 44% by weight, and;
  (e) dewatering the concentrated precipitate to provide a dry protein isolate.

26. A process as set forth in claim 25 wherein the insoluble solids from said aqueous extraction are separated from the extractant and extracted with a second portion of an aqueous extractant to provide a second aqueous protein extract having a pH of at least about 7.0 which is combined with said first extract prior to precipitation of the protein.

27. A process as set forth in claim 25 wherein dewatering of the precipitate is carried out by spray drying of the precipitate to provide a dry protein isolate.

28. A process as set forth in claim 25 wherein said aqueous extraction is carried out at a temperature of between about ambient to 120° F.

29. A process as set forth in claim 25 wherein the pH is adjusted to between about 4.4 to 4.6.

30. A process as set forth in claim 25 wherein heating is carried out at a temperature of between about 130° and 135° F.

31. A process as set forth in claim 25 wherein heating of the precipitated protein is carried out for between about 1 to 300 seconds.

32. A process as set forth in claim 25 wherein heating of the precipitated protein is carried out for between about 2–10 seconds.

* * * * *